(12) United States Patent
Kondo et al.

(10) Patent No.: US 8,070,890 B2
(45) Date of Patent: Dec. 6, 2011

(54) INDUCTION HARDENED HOLLOW DRIVING SHAFT

(75) Inventors: Kunio Kondo, Sanda (JP); Kouichi Kuroda, Osaka (JP)

(73) Assignee: Sumitomo Metal Industries, Ltd., Osaka-shi (JP)

( * ) Notice: Subject to any disclaimer, the term of this patent is extended or adjusted under 35 U.S.C. 154(b) by 411 days.

(21) Appl. No.: 12/346,569

(22) Filed: Dec. 30, 2008

(65) Prior Publication Data
US 2009/0145525 A1 Jun. 11, 2009

Related U.S. Application Data

(63) Continuation-in-part of application No. 11/903,940, filed on Sep. 25, 2007, now abandoned, which is a continuation of application No. PCT/JP2006/305910, filed on Mar. 24, 2006.

(30) Foreign Application Priority Data

Mar. 25, 2005 (JP) ................................. 2005-088219

(51) Int. Cl.
C22C 38/32 (2006.01)
C22C 38/28 (2006.01)
(52) U.S. Cl. ........ 148/330; 148/333; 148/334; 148/335; 148/909
(58) Field of Classification Search .................. 148/320, 148/333–335, 330, 909, 593, 590
See application file for complete search history.

(56) References Cited

U.S. PATENT DOCUMENTS

| | | | | |
|---|---|---|---|---|
| 5,545,267 A * | 8/1996 | Ochi et al. | | 148/335 |
| 6,319,337 B1 * | 11/2001 | Yoshida et al. | | 148/320 |
| 6,602,359 B1 | 8/2003 | Ochi et al. | | |
| 7,316,143 B2 * | 1/2008 | Kondo et al. | | 72/97 |
| 2004/0099355 A1 * | 5/2004 | Toyooka et al. | | 148/593 |

FOREIGN PATENT DOCUMENTS

EP 1 178 126 12/2000

(Continued)

OTHER PUBLICATIONS

Machine-English translation of Japanese patent No. 2005-060730, Matsuzaki Akihiro et al., Mar. 3, 2005.*

(Continued)

*Primary Examiner* — Deborah Yee
(74) *Attorney, Agent, or Firm* — Marshall, Gerstein & Borun LLP (57) ABSTRACT

The present invention provides an induction-hardened hollow driving shaft that comprises, as a raw material, a steel pipe that contains, by mass %, 0.30 to 0.47% C, 0.5% or less Si, 0.3 to 2.0% Mn, 0.018% or less P, 0.015% or less S, 0.15 to 1.0% Cr, 0.001 to 0.05% Al, 0.005 to 0.05% Ti, 0.004% or less Ca, 0.01% or less N, 0.0005 to 0.005% B and 0.0050% or less O (oxygen) and the balance Fe and impurities and of which Beff defined by an equation (a) or (b) below is 0.0001 or more, wherein a prior austenite grain size number (JIS G0551) after the hardening is 9 or more. Here, in the case of Neff=N−14× Ti/47.9≧0, Beff=B−10.8×(N−14×Ti/47.9)/14 . . . (a), and, in other cases, Beff=B . . . (b). According to the present invention, a hollow driving shaft that is simultaneously provided with excellent cold workability, hardenability, toughness and torsional fatigue strength and can exert stable fatigue lifetime can be obtained and can be widely utilized.

4 Claims, 4 Drawing Sheets

FOREIGN PATENT DOCUMENTS

| | | |
|---|---|---|
| JP | 06-341422 | 12/1994 |
| JP | 07-018330 | 1/1995 |
| JP | 07-090484 | 4/1995 |
| JP | 2000-154819 | 6/2000 |
| JP | 2000-204432 | 7/2000 |
| JP | 2001-240941 | 9/2001 |
| JP | 2001-355047 | 12/2001 |
| JP | 2002-069566 | 3/2002 |
| JP | 2005-060730 | 3/2005 |
| JP | 2005-320575 | 11/2005 |
| WO | WO-01/48258 | 12/2000 |

OTHER PUBLICATIONS

Machine-English translation of Japanese patent No. 08-073938, Fujioka Yasuhide et al., Mar. 19, 1996.*

* cited by examiner

INDUCTION HARDENED HOLLOW DRIVING SHAFT

CROSS REFERENCE TO RELATED APPLICATIONS

This application is a continuation-in-part of prior U.S. patent application Ser. No. 11/903,940 filed Sep. 25, 2007 now abandoned which is a continuation of PCT/JP2006/305910 filed Mar. 24, 2006 which claims priority under 35 U.S.C.§119 of Japanese Patent Application No. 2005-088219 filed Mar. 25, 2005.

BACKGROUND OF THE INVENTION

1. Field of the Invention

The present invention relates to an induction hardened hollow driving shaft suitable for reducing weight of a driving shaft that transmits an engine diving force of an automobile to respective wheels such as a drive shaft, in more detail, an induction hardened hollow driving shaft excellent in cold workability, hardenability, toughness and torsional fatigue strength that are demanded as fundamental characteristics of the driving shaft.

2. Description of the Related Art

Of automobile parts, in a drive shaft that is used as a driving shaft that transmits an engine driving force to wheels, as an automobile engine becomes higher in its output, a demand for higher strength is stronger. Normally, as the strength characteristics necessary for the drive shaft, the torsional fatigue strength is cited. Accordingly, hitherto, with a drive shaft having a solid structure, a drive shaft that exerts excellent torsional fatigue strength characteristics and steel that is used therefor have been proposed.

Although the deeper a depth of a hardened layer is, the more the fatigue strength of the driving shaft is improved, when the hardened layer is made excessively deep, there is a risk of quench crack. Accordingly, in Japanese Patent Application Publication No. 2000-154819, proposed is a high strength drive shaft where, in order to obtain a high strength drive shaft, an upper limit of a depth of the hardened layer is defined, and, in order to secure the hardness of the hardened layer, higher C and lower Cr are aimed in a composition design.

In the torsional fatigue fracture of an induction hardened member, since a crack occurs in a plane in parallel with a longitudinal direction of the shaft and at a boundary between a surface or a hardened layer and a core portion and initially propagates in a plane in parallel with the longitudinal direction, when elongated MnS is present in the longitudinal direction, along the elongated MnS, an occurrence and the initial propagation of the crack are promoted. Accordingly, Japanese Patent Application Publication No. 2002-69566 has proposed induction hardening steel where MnS is granulated and made finer. Thereby, the crack is inhibited from occurring and initiating the propagation and thereby the torsional fatigue strength can be improved.

The high strength drive shaft and the induction hardening steel proposed in the Japanese Patent Application Publication Nos. 2000-154819 and 2002-69566 are applied as a method of improving the torsional fatigue strength of a driving shaft that postulates a solid structure and expected to exhibit predetermined strength characteristics.

However, from a viewpoint of a recent further global environmental protection, it is strongly demanded to make an automobile body lighter to improve the fuel efficiency. Accordingly, there has been variously attempted to replace, in automobile parts, solid members with hollow members. As one of the attempts, as a driving shaft, a hollow structure is under study to adopt. When an automobile part is made a hollow structure, not only simple lightweight, but also an improvement in acceleration response owing to an improvement in the torsional stiffness and an improvement in the quietness in a running car owing to an improvement in the vibration characteristics can be expected.

In order to achieve such expectations, a development of a hollow driving shaft fabricated into a special shape is strongly demanded. For instance, in a design of a shaft that engages both shaft end portions with constant-velocity joints, while an intermediate portion of a driving shaft is made as small as possible in the thickness and as large as possible in the diameter to heighten the torsional stiffness and improve the vibration characteristics, the both shaft end portions that engage with the constant-velocity joints are made with a diameter same as that of the solid member used thus far, and thereby an existing constant-velocity joint can be favorably used as it is.

As a manufacturing method of a hollow driving shaft, there is a method where to both end portions of a hollow blank tube hollow or solid shafts are engaged by use of a friction welding method. However, in the method, it is difficult to make a diameter of the hollow portion larger and that of the both end portions smaller. From the above reason, in order to form a driving shaft having a shape where an intermediate portion is made as small in the thickness and as large in the diameter as possible and diameters of the both end portions are made small, a steel pipe material is cold worked to make the intermediate portion thinner in the thickness, followed by applying cold reducing process etc. to both ends of the steel pipe material to reduce outer diameters of the both end portions to thicken the wall thickness thereof, and thereby an integrally formed hollow driving shaft is manufactured.

In the integrally formed hollow driving shaft, in order to secure a special shape thereof, a complicated cold working is applied to form. Accordingly, in order to do so without the occurrence of the crack caused during the cold working and to secure the torsional fatigue strength after the working, as a raw material of an integrally formed hollow driving shaft, for instance, a seamless steel pipe is necessarily adopted.

When an integrally formed hollow driving shaft is manufactured with a steel pipe as a hollow shaft material, it is important to inhibit the crack due to the reducing process or spinning process at the pipe end from occurring. Furthermore, it is demanded that after the cold working, the heat treatment is applied to harden over an entire thickness of the steel pipe from an outer surface to an inner surface to secure high toughness and furthermore to secure the torsional fatigue strength so as to enable to obtain long lifetime as a product.

In other words, in the hollow driving shaft of which raw material is a steel pipe, it is indispensable to satisfy the cold workability that enables to easily obtain a complicated shape, the hardenability accompanying the heat treatment, and the toughness and torsional fatigue strength, and to achieve stable fatigue lifetime as the driving shaft. However, in the hollow driving shafts hitherto proposed, studies from the viewpoints of materials or the grain boundary strength have hardly done.

For instance, in Japanese Patent Application Publication No. 6-341422, a drive shaft where a balance weight is attached to a driving shaft steel pipe to reduce the rotational whirling is disclosed, and it is further disclosed that, when values of carbon equivalents ($Ceq=C+Si/24+Mn/6+Cr/5+Mo/4+Ni/40+V/14$) of the driving shaft steel pipe and the balance weight are defined, the fatigue fracture generated from a site where the balance weight is welded can be reduced.

However, when only values of carbon equivalents (Ceq) of the driving shaft steel pipe and the balance weight are defined, the driving shaft steel pipe excellent in both the cold workability and the fatigue characteristics cannot be obtained. Accordingly, it is difficult to apply an automobile drive shaft disclosed in the Japanese Patent Application Publication No. 2000-154819 as an integrally formed hollow driving shaft.

In the next place, in Japanese Patent Application Publication No. 7-18330, a manufacturing method of high strength and high toughness steel pipe suitable for a high strength member used in automobile underbody members is proposed. In the manufacturing method according to the disclosure, a specific composition system is defined. However, since neither Ti is added nor N is defined, even when B is added, it is not a composition system that can secure sufficient hardenability. Furthermore, since neither the cold workability nor the fatigue characteristics is considered in the composition design, in the manufacturing method proposed in Japanese Patent Application Publication No. 7-18330, it is difficult to obtain an integrally formed hollow driving shaft.

On the other hand, Japanese Patent Application Publication No. 2000-204432 discloses a drive shaft where the induction hardening is applied to graphite steel to harden a superficial layer and to generate two-phase structure of ferrite and martensite at a core portion. However, a chemical composition that the Japanese Patent Application Publication No. 2000-204432 discloses shows a composition system suitable for a hollow driving shaft steel material for use in the friction welding and it takes a long heat treatment time to obtain graphitized steel. Furthermore, since the chemical composition does not include Cr and the hardenability and the fatigue strength are insufficient, an integrally formed driving shaft cannot be obtained.

In Japanese Patent Application Publication No. 2001-355047, as a raw material of a drive shaft, a high carbon steel pipe that has a grain diameter of cementite of 1 μm or less and is excellent in the cold workability and the induction hardenability is proposed. However, in the high carbon steel pipe proposed in Japanese Patent Application Publication No. 2001-355047, since the warm working is necessary to obtain a target microstructure, the manufacturing cost goes up. At the same time, the disclosed steel composition cannot constitute an integrally formed hollow driving shaft simultaneously satisfying the cold workability, the hardenability and the fatigue characteristics.

In order to not only simply achieve lightweight but also achieve an improvement in acceleration response owing to an improvement in the torsional stiffness and in the quietness in a running car room owing to an improvement in the vibration characteristics, a development of hollow driving shaft is necessary. When a solid driving shaft is manufactured, as the heat treatment, the surface hardening is applied. On the other hand, when a hollow driving shaft is manufactured, in order to secure sufficient strength, it is necessary to apply the hardening over an entire thickness to an inner surface of the driving shaft.

As described in Japanese Patent Application Publication No. 2002-69566, in the torsional fatigue fracture in the solid diving shaft, a crack is generated in a plane in parallel with the longitudinal direction at a boundary between a surface or a hardened layer and a core portion. On the contrary, according to a study by the present inventors, the torsional fatigue fracture in the hollow diving shaft is generated in a direction that is at 45° to the longitudinal direction, and in a principal stress plane. This is because while in the solid driving shaft a deformation energy that accompanies load of the torsional torque is absorbed by a low hardness region inside of the solid driving shaft, in the hollow driving shaft such an action of absorption of the deformation energy is not generated.

According to a further study of the present inventors, in the hollow driving shaft, owing to the load of the torsional torque, the intergranular fracture tends to occur. In particular, when the intergranular fracture occurs at an early stage, the torsional fatigue fracture rapidly progresses and the fatigue lifetime of the driving shaft becomes obviously instable. The instability of the fatigue lifetime as well is assumingly caused by the fact that in the hollow driving shaft the deformation energy accompanying the torsional torque is not absorbed in a low hardness region inside of the shaft.

Thus, in the hollow driving shaft and the solid driving shaft, owing to difference of the hardened microstructures due to the heat treatment, fracture behaviors under torsional torque load are different. Accordingly, in order to improve the torsional fatigue fracture of the hollow driving shaft and to stabilize the fatigue lifetime thereof, improvement methods of the torsional fatigue strength proposed in Japanese Patent Application Publication Nos. 2000-154819 and 2002-69566 cannot be applied. That is, in the hollow driving shaft, since owing to the load of the torsional torque the intergranular fracture tends to occur, in order to improve the torsional fatigue fracture of the hollow driving shaft and to stabilize the fatigue lifetime thereof, the strength of a prior austenite grain boundary is necessarily secured.

On the other hand, when a steel pipe is used as a raw material of the hollow driving shaft, it is necessary that the crack due to the reducing process or spinning process at the pipe end is inhibited from occurring, the heat treatment is applied after the cold working to harden an entire thickness through an inner surface of the steel pipe and to secure high toughness, and furthermore in order to display excellent performance as the hollow driving shaft, the cold workability, the hardenability, the toughness and the torsional fatigue strength are simultaneously secured.

However, in proposals of Japanese Patent Application Publication Nos. 6-341422, 7-18330, 2000-204432 and 2001-355047, there is hardly found an attempt where so as to exhibit, as a hollow driving shaft with a steel pipe as a raw material, excellent cold workability, the hardenability, the toughness and the torsional fatigue strength, raw materials and grain boundary strength are studied and thereby the chemical composition and grain diameter are specified.

In other words, each of the characteristics that the hollow driving shaft demands is not difficult to improve individually. However, according to existing knowledge, it is considered difficult to simultaneously satisfy all the characteristics. For instance, since, in order to secure high fatigue strength, the strength of the steel is effectively increased, when the steel pipe that is used as a raw material is made high in the strength, whereby the cold workability is deteriorated accordingly.

SUMMARY OF THE INVENTION

The present invention was carried out in view of the above-mentioned situations. The present inventors, by studying materials based on the characteristics demanded on a hollow driving shaft, and thereby specifying a chemical composition and securing the strength of a prior austenite grain boundary in accordance with the fracture behavior under the load of the torsional torque, intend to provide an induction hardened hollow driving shaft that is excellent in the cold workability, the hardenability, the toughness and the torsional fatigue strength and can exert stable fatigue lifetime.

The present inventors, in order to overcome the problems, variously studied effects of alloy elements affecting on the cold workability, the hardenability, the toughness and the torsional fatigue strength. Firstly, effects of Si and Cr affecting on the cold workability were studied.

Figure 1:
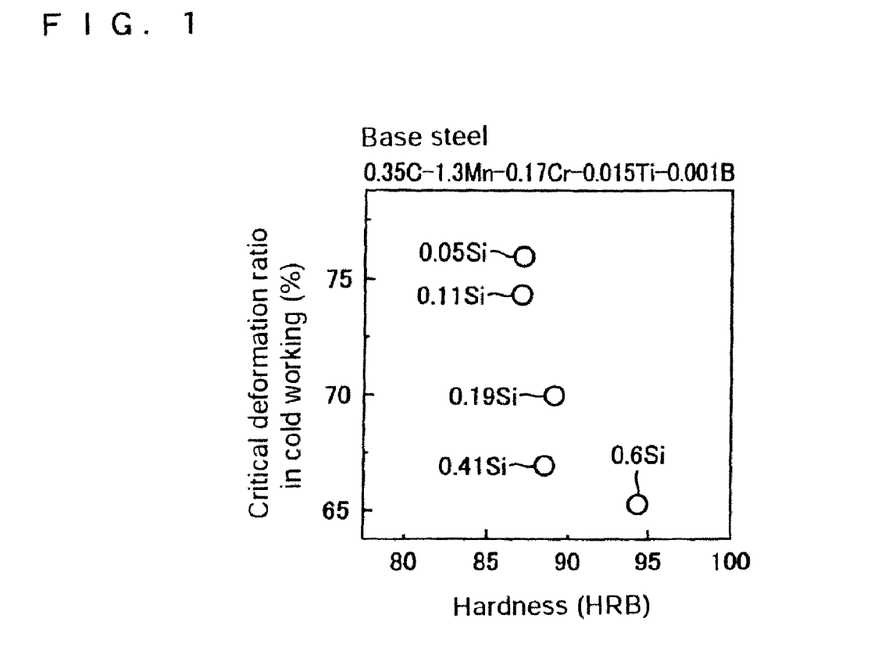
FIG. 1 is a diagram showing an effect of Si affecting on the cold workability.

FIG. 1 is a diagram showing an effect of Si affecting on the cold workability (cold forging). When 0.35% C-1.3% Mn-0.17% Cr-0.015% Ti-0.001% B steel was used as base steel and a Si content was varied, with compression test pieces each having 14 mm ϕ×21 mm in length, the relationship between the critical deformation ratio in cold working (%) where the crack is not generated and the hardness (HRB) was investigated. Results are shown in FIG. 1.

Figure 2:
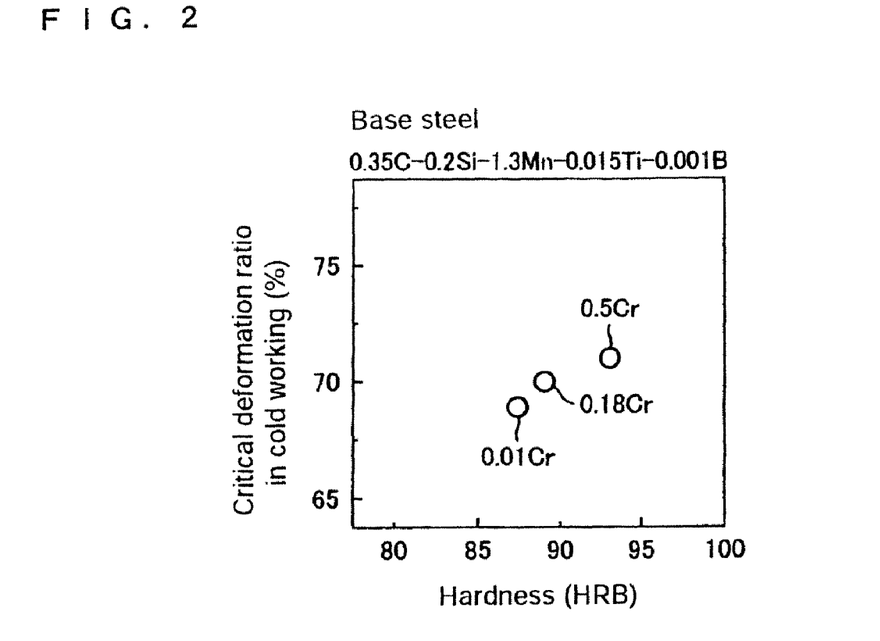
FIG. 2 is a diagram showing an effect of Cr affecting on the cold workability.

FIG. 2 is a diagram showing an effect of Cr affecting on the cold workability (cold forging). When 0.35% C-0.2% Si-1.3% Mn-0.015% Ti-0.001% B steel was used as base steel and a Cr content was varied, with compression test pieces each having 14 mm ϕ×21 mm in length, the relationship between the critical deformation ratio in cold working (%) where the crack is not generated and the hardness (HRB) was investigated. Results are shown in FIG. 2.

As shown in FIG. 1, it is found that when the content of Si is reduced, the cold working limit rate where the crack is generated at the cold working can be largely improved. Furthermore, as shown in FIG. 2, it is found that when the content of Cr is increased the cold workability can be slightly improved. On the contrary, other elements slightly deteriorated the cold workability or hardly affected thereon.

However, when the content of Si is reduced to improve the cold workability, the hardenability is deteriorated. Accordingly, the strength of an inner surface of a heat-treated steel pipe cannot be secured. As a result, in addition to an improvement in the cold workability owing to the reduction of the content of Si, an improvement in the hardenability has to be studied.

Figure 3:
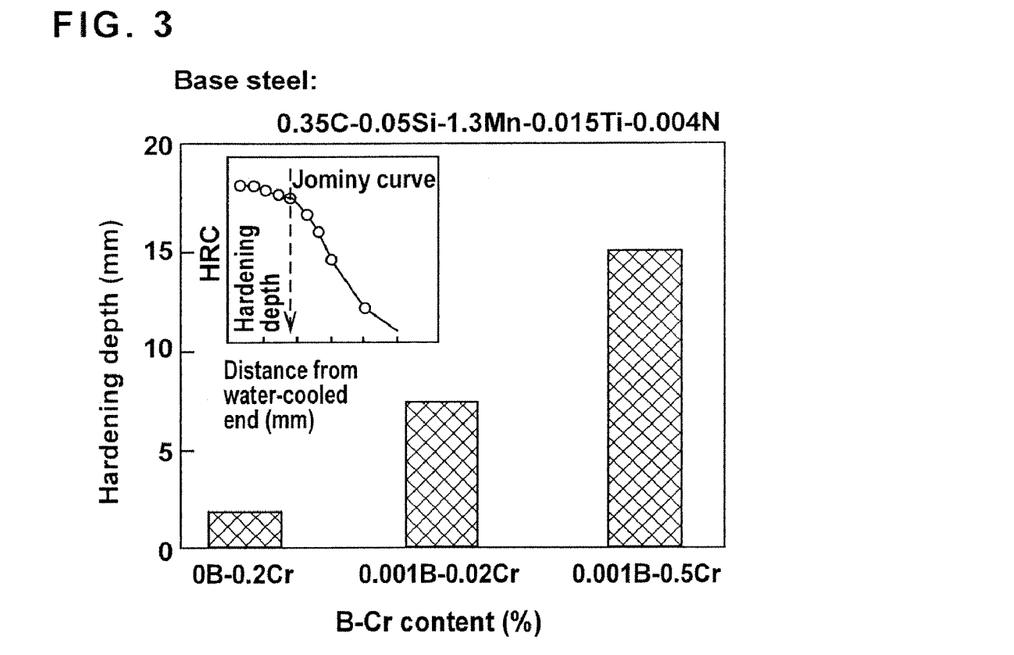
FIG. 3 is a diagram showing effects of B and Cr affecting on the hardenability.

FIG. 3 is a diagram showing an effect of B and Cr affecting on the hardenability. With 0.35% C-0.05% Si-1.3% Mn-0.015% Ti-0.004% N steel as base steel, test pieces where a B—Cr content was varied were prepared, followed by carrying out a Jominy end quench test. In the drawing, an example of a hardness distribution with a distance from a water-cooled end is shown, and a distance from the water-cooled end of a point where a gradient of the hardness descent becomes rapidly large is taken as a hardening depth. As shown in FIG. 3, when contents of B or/and Cr are increased, the hardenability can be improved.

Figure 4:
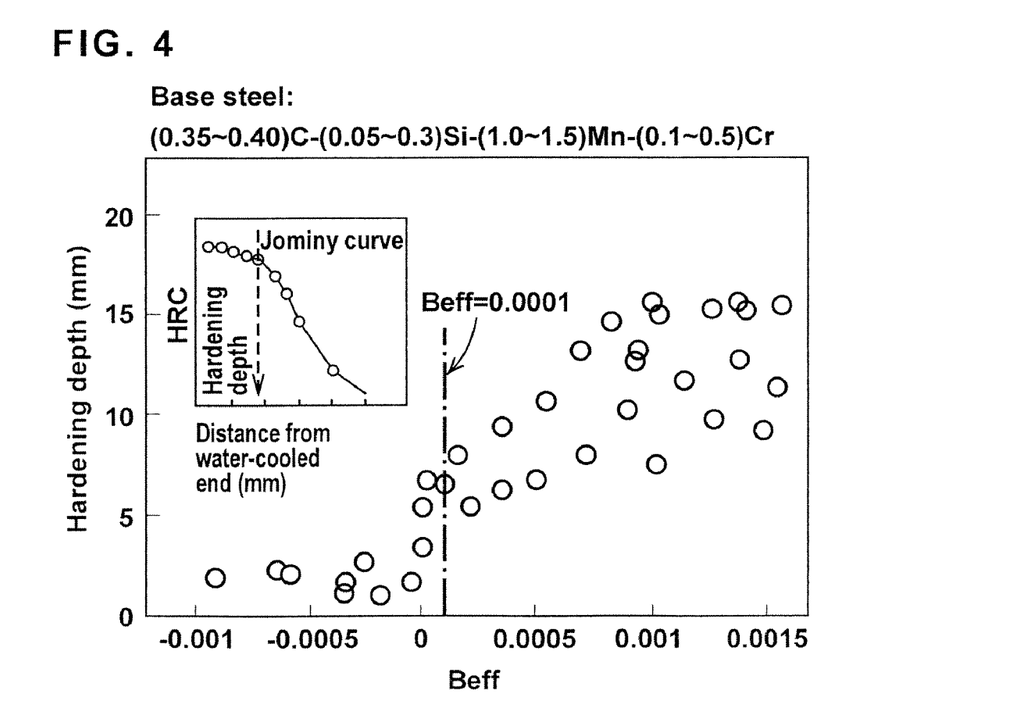
FIG. 4 is a diagram showing effects of B, N and Ti affecting on the hardenability.

FIG. 4 is a diagram showing effects of B, N and Ti affecting on the hardenability. With (0.35 to 0.40) % C-(0.05 to 0.3) % Si-(1.0 to 1.5) % Mn-(0.1 to 0.5) % Cr steel as base steel, contents of B, N and Ti were varied, and, similarly to the case of FIG. 3, a Jominy end quench test was carried out to measure the hardening depth.

At this time, in order to investigate an effect of a content balance of B, N and Ti affecting on the hardening depth of the test piece, Beff defined by an equation (a) or (b) below was used.

In the case of Neff=N−14×Ti/47.9≧0

$$Beff=B-10.8\times(N-14\times Ti/47.9)/14 \quad (a),$$

and
in the case of Neff=N−14×Ti/47.9<0

$$Beff=B \quad (b).$$

From the relationship between the hardening depth and the Beff, which is shown in FIG. 4, in order to secure the hardenability of steel, it is found that the content balance of B, Ti and N is very important and unless the condition of Beff≧0.0001 is satisfied, sufficient hardenability cannot be obtained.

Figure 5:
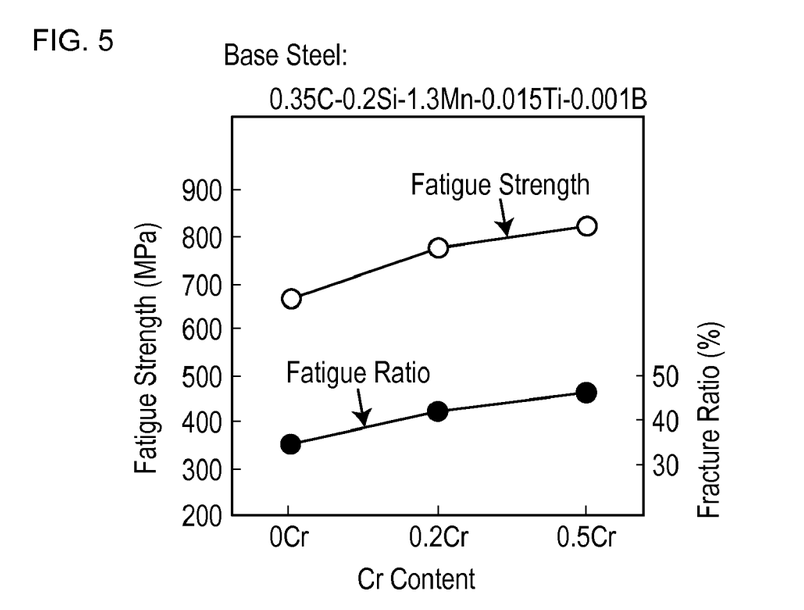
FIG. 5 is a diagram showing an effect of Cr affecting on the fatigue strength and the fracture ratio.

FIG. 5 is a diagram showing effects of Cr affecting on the fatigue strength and the fracture ratio. With 0.35% C-0.2% Si-1.3% Mn-0.015% Ti-0.001% B steel as base steel, a content of Cr was varied, followed by measuring the fatigue strength and the fracture ratio according to Ono type rotary bending test. The fracture ratio was shown with [fatigue strength/tensile strength].

As shown in FIG. 5, when the content of Cr is increased, with an increase in the fatigue strength, the fracture ratio increases substantially similarly. Accordingly, without increasing the tensile strength, the fatigue strength can be increased. From this, it is found that, when the fatigue strength is increased with an increase of the content of Cr, the adverse effect on the cold workability and the toughness is less.

So far, it is known that in order to increase the fatigue strength the tensile strength is necessarily increased. Accordingly, in order to increase the fatigue strength, the C content is increased. However, there is a problem in that, owing to an increase in the C content, the cold workability and the toughness are deteriorated. However, from a finding shown in the FIG. 5, it is found that when the Cr content is increased to improve the fatigue strength, without increasing the C content, while suppressing the deterioration of the cold workability and the toughness, the fatigue strength can be secured.

Figure 6:
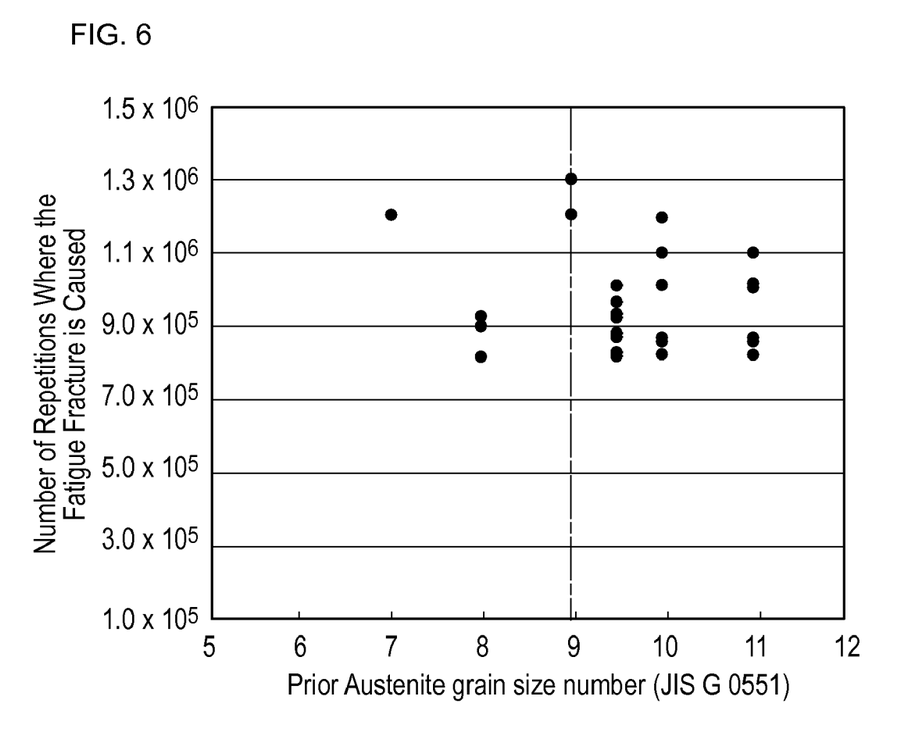
FIG. 6 is a diagram showing an effect of a prior austenite grain size after heat treatment affecting on the torsional fatigue strength of a diving shaft.

FIG. 6 is a diagram showing an effect of a heat-treated prior austenite grain size affecting on the torsional fatigue strength of a driving shaft. As a test material, a seamless steel pipe was used. From the prepared test material, a test piece having a parallel portion of 29 mm ϕ×5 mm t was cut out, followed by applying the induction hardening (maximum heating temperature: 1000° C.), further followed by tempering at 160° C. To an obtained test piece, unidirectional-repetitive-torsional torque of 2300 N·m was applied, and the number of repetitions where the fatigue fracture occurred was measured.

As the test material, (0.30 to 0.47)% C-(0.05 to 0.5)% Si-(0.3 to 2.0)% Mn-(0.15 to 1.0)% Cr-(0.001 to 0.05)% Al-(0.005 to 0.05)% Ti-(0.0005 to 0.005)% B steels were used and all test materials had the chemical compositions defined according to the present invention.

A shown in FIG. 6, when a test piece of which grain size is coarse such as 8 or less in the prior austenite grain size number (JIS G0551) is used, the number of repetitions where the fatigue fracture occurs scatters very much. On the other hand, when a test piece of which grain size is fine such as 9 or more in the prior austenite grain size number is used, the number of repetitions where the fatigue fracture occurs is stable at a high level. Accordingly, when a condition that the grain size is fine such as 9 or more in the prior austenite grain size number (JIS G0551) is satisfied, as the driving shaft, stable and excellent fatigue lifetime can be exerted.

When, based on the technical findings shown in FIGS. 1 through 6, a chemical composition of a steel pipe that is a raw material is specified and the strength of the prior austenite grain after the induction hardening is secured, excellent cold workability, the hardenability, the toughness and the torsional fatigue strength can be simultaneously secured and thereby an integrally formed hollow driving shaft that can exert stable fatigue lifetime can be obtained.

The present invention was completed based on the above-mentioned findings, and an induction-hardened hollow diving shaft according to the present invention uses a steel pipe that contains, by mass %, 0.30 to 0.47% C, 0.5% or less Si, 0.3 to 2.0% Mn, 0.018% or less P, 0.015% or less S, 0.15 to 1.0% Cr, 0.001 to 0.05% Al, 0.005 to 0.05% Ti, 0.004% or less Ca, 0.01% or less N, 0.0005 to 0.005% B, 0.0050% or less O (oxygen) and the balance Fe and impurities and of which Beff defined by an equation (a) or (b) below is 0.0001 or more, wherein the prior austenite grain size number (JIS G0551) after hardening is 9 or more.

Here with Ti, N and B each representing a content by %, in the case of Neff=N−14×Ti/47.9≧0, $$\text{Beff}=B-10.8\times(N-14\times Ti/47.9)/14 \tag{a},$$

and similarly in the case of Neff=N−14×Ti/47.9<0, $$\text{Beff}=B \tag{b}.$$

It is preferable that the induction hardened hollow driving shaft further comprises at least one of, by mass %, 1% or less Cu, 1% or less Ni and 1% or less Mo, and/or at least one of, by mass %, 0.1% or less V and 0.1% or less Nb.

According to the induction hardened hollow driving shaft according to the present invention, excellent cold workability, hardenability, toughness and torsional fatigue strength can be simultaneously satisfied. Accordingly, when a steel pipe as a hollow shaft raw material is subjected to the reducing process or spinning process at the pipe end, the crack due to the processing can be inhibited from occurring, and, owing to the induction hardening after the cold working, entire thickness through an inner surface of the steel pipe can be hardened and simultaneously high toughness can be secured, resulting in achieving stable fatigue lifetime as a driving shaft.

DETAILED DESCRIPTION OF THE PREFERRED EMBODIMENTS

The reason why a hollow driving shaft, a target of the present invention, is defined as mentioned above will be detailed. In the description below, a chemical composition is shown with "mass %".

C: 0.30 to 0.47%

C is an element that increases the strength and improves the fatigue strength but deteriorates the cold workability and the toughness. When a C content is less than 0.30%, sufficient hardness cannot be obtained. On the other hand, when the C content exceeds 0.47%, the cold workability is deteriorated, the hardness after the hardening becomes excessively high to deteriorate the toughness to accelerate the intergranular fracture, resulting in deteriorating the torsional fatigue strength.

In the hollow driving shaft, in comparison with a solid driving shaft, from a shape thereof, a cooling rate becomes faster to be easily excessive in the quench hardness. Accordingly, there is a risk of inducing the intergranular fracture. As a result, an upper limit of the C content is preferably set to 0.42% and further preferably set to 0.40%.

Si: 0.5% or less

Si is an element that works as a deoxidizing agent. However, when the content thereof exceeds 0.5%, the cold workability cannot be secured; accordingly, it is set to 0.5% or less. As shown in the FIG. 1, the less the Si content is, the more improved the cold workability is. Accordingly, the Si content is preferably set to 0.22% or less so as to be able to cope with the more severe cold working, and, in the case of further heavier processing being applied, more preferably set to 0.14% or less.

Mn: 0.3 to 2.0%

Mn is an element effective in securing the hardenability during the heat treatment and improving the strength and the toughness. In order to exert the advantage to sufficiently harden over an entire thickness to an inner surface, the Mn content of 0.3% or more is necessary. On the other hand, when Mn is contained exceeding 2.0%, the cold workability is deteriorated. Accordingly, the Mn content is set in the range of 0.3 to 2.0%. Furthermore, in order to secure the hardenability and the cold workability with an excellent balance, the Mn content is preferably set in the range of 1.1 to 1.7% and more preferably in the range of 1.2 to 1.4%.

P: 0.018% or less

P is contained in steel as an impurity and concentrated in the vicinity of a final solidifying position at the solidification and segregates at a grain boundary to deteriorate the hot workability, the toughness and the fatigue strength. When the P content exceeds 0.018%, due to the grain boundary segregation, the toughness is largely deteriorated to induce the intergranular fracture to cause instability of the torsional fatigue strength. In order to maintain the toughness and the fatigue strength of the driving shaft at a high level, the preferable P content is 0.009% or less.

S: 0.015% or less

S is contained in the steel as an impurity and segregates at a grain boundary at the solidification to deteriorate the hot workability and the toughness. When the S content exceeds 0.015%, MnS is numerously generated to deteriorate the cold workability and cause the deterioration of the torsional fatigue strength. When a further heavier processing is applied, the S content is preferably set to 0.005% or less.

Cr: 0.15 to 1.0%

Cr is an element that, as shown in FIGS. 2 and 5, without causing so much deterioration of the cold workability, improves the fatigue strength, and, as shown further in FIG. 3, is effective as well in an improvement of the hardenability similarly to B. Accordingly, in order to secure predetermined fatigue strength, the Cr content is set to 0.15% or more. On the other hand, when Cr is present exceeding 1.0%, the cold workability is drastically deteriorated. As a result, the Cr content is set in the range of 0.15 to 1.0%.

Furthermore, in order to secure the fatigue strength, the cold workability and the hardenability with excellent balance, the Cr content is preferably set in the range of 0.2 to 0.8% and more preferably in the range of 0.3 to 0.6%.

Al: 0.001 to 0.05%

Al is an element that works as a deoxidizing agent. In order to obtain an advantage as the deoxidizing agent, the Al content is necessary to be 0.001% or more. However, when the content thereof exceeds 0.05%, an alumina based inclusion increases to deteriorate the fatigue strength and the surface properties of a cut surface. Accordingly, the Al content is set in the range of 0.001 to 0.05%. Furthermore, in order to secure stable surface properties, the Al content is preferably set in the range of 0.001 to 0.03%.

Ti, N and B described below, in order to secure the hardenability of steel, are respectively defined for the respective element contents and further have to satisfy conditional equations defining a balance between the respective contents.

Ti: 0.005 to 0.05%

Ti has a function of immobilizing N in the steel as TiN. However, when the Ti content is less than 0.005%, the capability of immobilizing N is not sufficiently exerted. On the other hand, when it exceeds 0.05%, the cold workability and the toughness of the steel are deteriorated. Accordingly, the Ti content is set in the range of 0.005 to 0.05%.

N: 0.01% or less

N is an element that deteriorates the toughness, and readily combines with B in the steel. When the N content exceeds 0.01%, the cold workability and the toughness are largely deteriorated. Accordingly, the N content is set to 0.01% or less. From a viewpoint of improving the cold workability and the toughness, it is preferably 0.007% or less.

B: 0.0005 to 0.005%

B is an element that improves the hardenability. When the B content is less than 0.0005%, the hardenability becomes insufficient. On the other hand, B, when contained exceeding 0.005%, precipitates at a grain boundary to cause the intergranular fracture to thereby deteriorate the torsional fatigue strength.

Furthermore, as shown in the FIG. 4, as for a postulation that B improves the hardenability, the Beff defined according to an equation (a) or (b) below has to satisfy 0.0001 or more.

That is, in the case of Neff=N−14×Ti/47.9≧0, $$Beff=B-10.8\times(N-14\times Ti/47.9)/14 \quad (a),$$

and, similarly, in the case of Neff=N−14×Ti/47.9<0, $$Beff=B \quad (b).$$

In order that B may exert the ability of improving the hardenability, an effect of N in the steel has to be nullified. B and N easily combine, and, when free N is present in the steel, N combines with B to generate BN. As a result, the advantage of improving the hardenability, which B has, is not exerted. Accordingly, in order that Ti is added in accordance with the N content to immobilize as TiN and thereby to leave B in the steel to make effectively exert the hardenability, the Beff is necessary to satisfy 0.0001 or more.

Furthermore, the larger the Beff becomes, the more improved the hardenability is. Accordingly, the Beff preferably satisfies 0.0005 or more, and more preferably satisfies 0.001 or more.

Ca: 0.004% or less

Ca is in some cases compelled to be added to improve the workability when steel is cast. However, when it is contained exceeding 0.004%, the inclusion increases to greatly deteriorate the cold workability and the surface properties of a cut surface. Accordingly, the Ca content is set to 0.004% or less. The Ca content is preferably set to 0.0004% or less.

O (oxygen): 0.0050% or less

O is an impurity that deteriorates the toughness and the fatigue strength. When the O content exceeds 0.0050%, the toughness and the fatigue strength are greatly deteriorated. Accordingly, it is set to 0.0050% or less.

Elements below are not necessarily added. However, when, as needs arise, at least one of elements below is contained, the cold workability, the hardenability, the toughness and the torsional fatigue strength can be further improved.

Cu: 1% or less, Ni: 1% or less, and Mo: 1% or less

Cu, Ni and Mo each is an element that may not be added but is effective in improving the hardenability to heighten the strength of the steel to thereby improve the fatigue strength thereof. When these advantages are required, at least one of these can be contained. When each of elements Cu, Ni and Mo is contained less than 0.05%, an advantage of heightening the strength and improving the fatigue strength is less. However, when the content exceeds 1%, the cold workability is much deteriorated. Accordingly, when these are added, a content of each of Ni, Mo and Cu is set in the range of 0.05 to 1%.

V: 0.1% or less and Nb: 0.1% or less

V and Nb each is an element that may not be added but is effective in forming carbide to inhibit grain size from becoming coarse and thereby to improve the toughness. Accordingly, when the toughness of the steel is improved, at least one of these can be added. The advantage thereof can be obtained when each of V and Nb is contained 0.005% or more. However, when each of V and Nb is contained exceeding 0.1%, coarse precipitates are generated to deteriorate the toughness to the contrary. Accordingly, when these are added, a content of each of V and Nb is set in the range of 0.005 to 0.1%.

Prior austenite grain size number (JIS G0551): 9 or more

In the hollow driving shaft according to the present invention, when a steel pipe having the above-mentioned chemical composition as a raw material is subjected to the reducing process or spinning process at a pipe end, followed by cutting to a predetermined shape, further followed by applying the induction hardening, the prior austenite grain size number (JIS G0551) is controlled to be 9 or more.

As mentioned above, since the torsional fatigue fracture caused in the hollow driving shaft is generated in a 45° angle direction with respect to the longitudinal direction and in a principal stress plane, under the load of the torsional torque, the intergranular fracture tends to occur. Accordingly, in order to secure excellent fatigue strength in the hollow driving shaft, it is necessary to make the strength of the prior austenite grain boundary higher. However, when the prior austenite grain size is coarse such as 8 or less in the grain size number, in some cases, the incidence of the intergranular fracture during the torsional fatigue test increases and the fatigue strength is largely deteriorated. As a result, the fatigue lifetime of the hollow driving shaft scatters and stable fatigue lifetime cannot be secured.

In the hollow driving shaft according to the present invention, in order to secure the strength, the hardening is necessarily applied over an entire thickness. Accordingly, normally, the induction hardening at a frequency in the range of 1 to 50 kHz is applied in manufacture. When the frequency is too high, a heating region is limited to a surface portion. The above frequency region is selected to avoid this. Furthermore, in order to recover the toughness after the induction hardening to improve the torsional fatigue strength, after the induction hardening, the tempering under the condition of 150 to 200° C. is preferably applied.

EXAMPLES

According to the vacuum melting, steels of steel Nos. 1 through 23 having the chemical compositions shown in Table 1 were prepared. Among these, steels satisfying the chemical composition defined by the present invention were named inventive steels (steels Nos. 1 through 13) and other steels were named comparative steels (steels Nos. 14 through 23). With the melted steels as a raw material (billet), steel pipes having an outer diameter of 50.8 mm and a thickness of 7.9 mm were made by the tube making and rolling process. At this time, in order to make the forging ratio smaller and to prepare sample steels having a coarser prior austenite grain size, in the steels Nos. 11 through 13, a raw material having a small billet diameter was used.

TABLE 1

| Steel No. | Chemical Composition (by mass %, balance Fe and impurities) | | | | | | | | | |
|---|---|---|---|---|---|---|---|---|---|---|
| | C | Si | Mn | P | S | Cr | Al | Ti | N | B |
| 1 | 0.33 | 0.07 | 1.62 | 0.017 | 0.0019 | 0.49 | 0.022 | 0.019 | 0.0011 | 0.0008 |
| 2 | 0.36 | 0.07 | 1.66 | 0.004 | 0.0002 | 0.52 | 0.019 | 0.016 | 0.0051 | 0.0010 |
| 3 | 0.38 | 0.04 | 1.36 | 0.002 | 0.0012 | 0.31 | 0.020 | 0.017 | 0.0034 | 0.0007 |
| 4 | 0.33 | 0.07 | 1.32 | 0.004 | 0.0009 | 0.59 | 0.013 | 0.023 | 0.0057 | 0.0007 |
| 5 | 0.34 | 0.03 | 1.69 | 0.006 | 0.0025 | 0.25 | 0.012 | 0.024 | 0.0068 | 0.0006 |
| 6 | 0.34 | 0.07 | 1.25 | 0.009 | 0.0009 | 0.26 | 0.021 | 0.017 | 0.0055 | 0.0007 |
| 7 | 0.37 | 0.07 | 1.31 | 0.016 | 0.0026 | 0.59 | 0.010 | 0.017 | 0.002 | 0.0007 |
| 8 | 0.35 | 0.05 | 1.39 | 0.004 | 0.0013 | 0.35 | 0.010 | 0.021 | 0.0066 | 0.0011 |
| 9 | 0.37 | 0.07 | 1.48 | 0.011 | 0.0009 | 0.32 | 0.020 | 0.020 | 0.0066 | 0.0008 |
| 10 | 0.34 | 0.06 | 1.61 | 0.010 | 0.0014 | 0.35 | 0.024 | 0.020 | 0.0061 | 0.0006 |
| 11 | 0.36 | 0.07 | 1.66 | 0.004 | 0.0002 | 0.52 | 0.019 | 0.016 | 0.0051 | 0.0010 |
| 12 | 0.38 | 0.04 | 1.36 | 0.002 | 0.0012 | 0.31 | 0.020 | 0.017 | 0.0034 | 0.0007 |
| 13 | 0.34 | 0.07 | 1.25 | 0.009 | 0.0009 | 0.26 | 0.021 | 0.017 | 0.0055 | 0.0007 |
| 14 | 0.33 | 0.05 | 1.35 | *0.021 | 0.0010 | 0.55 | 0.020 | 0.025 | 0.0050 | 0.0010 |
| 15 | 0.36 | 0.06 | 1.71 | 0.011 | 0.0007 | 0.35 | 0.023 | 0.022 | 0.007 | 0.0011 |
| 16 | *0.27 | 0.06 | 1.66 | 0.016 | 0.0013 | 0.35 | 0.021 | 0.018 | 0.0055 | 0.0006 |
| 17 | *0.48 | 0.07 | 1.71 | 0.008 | 0.0014 | 0.35 | 0.020 | 0.023 | 0.0063 | 0.0007 |
| 18 | 0.34 | *0.55 | 1.55 | 0.020 | 0.0013 | 0.27 | 0.022 | 0.023 | 0.0066 | 0.0005 |
| 19 | 0.34 | 0.04 | *0.28 | 0.002 | 0.0010 | 0.36 | 0.013 | 0.018 | 0.0058 | 0.0011 |
| 20 | 0.34 | 0.07 | *2.53 | 0.010 | 0.0014 | 0.53 | 0.028 | 0.020 | 0.0068 | 0.0010 |
| 21 | 0.34 | 0.05 | 1.45 | 0.003 | 0.0029 | *0.05 | 0.017 | 0.015 | 0.0049 | 0.0011 |
| 22 | 0.33 | 0.06 | 1.32 | 0.001 | 0.0022 | 0.25 | 0.012 | 0.025 | *0.0218 | 0.0012 |
| 23 | 0.35 | 0.05 | 1.54 | 0.015 | 0.0005 | 0.21 | 0.016 | 0.023 | 0.0047 | *— |

| Steel No. | Chemical Composition (by mass %, balance Fe and impurities) | | | | Defining equations | | Remarks |
|---|---|---|---|---|---|---|---|
| | O | Ca | Cu, Mo, Ni | V, Nb | Neff | Beff | |
| 1 | 0.0020 | 0.0003 | | | −0.0034 | 0.0008 | Inventive steel |
| 2 | 0.0010 | 0.0002 | | | 0.0003 | 0.0007 | Inventive steel |
| 3 | 0.0008 | 0.0001 | | | −0.0012 | 0.0007 | Inventive steel |
| 4 | 0.0020 | 0.0003 | | | −0.0008 | 0.0007 | Inventive steel |
| 5 | 0.0010 | 0.0002 | Cu: 0.15 | | −0.0002 | 0.0006 | Inventive steel |
| 6 | 0.0020 | 0.0002 | Mo: 0.1 Ni: 0.3 | | 0.0004 | 0.0003 | Inventive steel |
| 7 | 0.0014 | 0.0001 | | V: 0.1 | −0.0023 | 0.0007 | Inventive steel |
| 8 | 0.0008 | 0.0002 | | | 0.0004 | 0.0007 | Inventive steel |
| 9 | 0.0021 | 0.0003 | Cu: 0.2 Ni: 0.2 | Nb: 0.015 | 0.0006 | 0.0002 | Inventive steel |
| 10 | 0.0017 | 0.0020 | Ni: 0.15 | | 0.0002 | 0.0004 | Inventive steel |
| 11 | 0.0010 | 0.0001 | | | 0.0003 | 0.0007 | Inventive steel |
| 12 | 0.0008 | 0.0001 | | | −0.0012 | 0.0007 | Inventive steel |
| 13 | 0.0020 | 0.0003 | Mo: 0.1 Ni: 0.3 | | 0.0004 | 0.0003 | Inventive steel |
| 14 | 0.0017 | 0.0002 | | | −0.0023 | 0.0010 | Comparative steel |
| 15 | 0.0015 | *0.005 | Cu: 0.18 | | 0.0004 | 0.0007 | Comparative steel |
| 16 | 0.0015 | 0.0001 | Ni: 0.15 | | 0.0002 | 0.0005 | Comparative steel |
| 17 | 0.0019 | 0.0001 | | | −0.0003 | 0.0007 | Comparative steel |
| 18 | 0.0022 | 0.0003 | Ni: 0.11 | | −0.0001 | 0.0005 | Comparative steel |
| 19 | 0.0018 | 0.0004 | | | 0.0004 | 0.0007 | Comparative steel |
| 20 | 0.0009 | 0.0003 | | V: 0.09 | 0.0007 | 0.0002 | Comparative steel |
| 21 | 0.0021 | 0.0014 | Mo: 0.06 | Nb: 0.021 | 0.0004 | 0.0007 | Comparative steel |

TABLE 1-continued

| | | | | | | |
|---|---|---|---|---|---|---|
| 22 | 0.0010 | 0.0013 | Ni: 0.13 | 0.0112 | −0.0100 | Comparative steel |
| 23 | 0.0015 | 0.0003 | | −0.0016 | — | Comparative steel |

Note)
Chemical compositions shown with * in the table are ones deviated from the conditions defined by the present invention.

The obtained steel pipe was subjected to the cold drawing process to an outer diameter of 40 mm and a thickness of 7 mm, followed by swaging to an outer diameter of 28 mm and a thickness of 9 mm, further followed by applying the flat pressing by 40% to evaluate the cold workability, and presence of the crack was observed. Results of the observed crack are shown in Table 2. Ones in which the crack was not observed are shown with ○ and ones where the crack was observed are shown with x.

Thereafter, the test material having an outer diameter of 28 mm and a thickness of 9 mm was subjected to the induction hardening (heating temperature: 920 to 1000° C.), followed by investigating the hardenability In this case, the Vickers hardness of an outer surface and the Vickers hardness of an inner surface were measured, and when the difference in the Vickers hardness thereof is 50 or less, the hardenability is judged good and shown with ○, while, when the difference exceeds 50, the hardenability is judged poor and shown with x.

In the next place, the raw material (billet) was subjected to the tube making and rolling process to an outer diameter of 46 mm and a thickness of 10.6 mm, after machining the outer surface, further subjected to the cold drawing process to an outer diameter of 38 mm and a thickness of 9.5 mm. From the obtained steel pipe, a short tube coupon of 300 mm in length was sampled and subjected to machining for obtaining a test piece for fatigue test.

Figure 7:
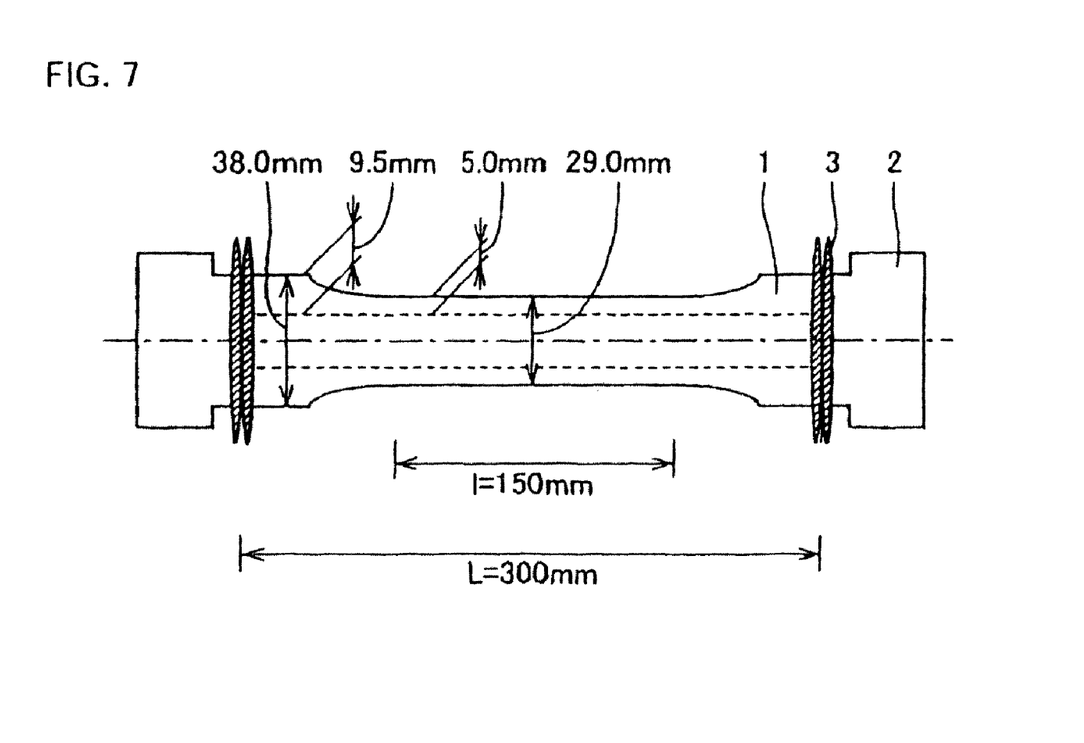
FIG. 7 is a diagram showing a configuration of a test piece for the fatigue test that was conducted in EXAMPLES.

FIG. 7 is a diagram showing a configuration of a test piece for the fatigue test that was conducted in EXAMPLES. The short tube coupon 1 sampled from the steel pipe was subjected to friction welding to attach a fatigue test fixture 2 at each end of the coupon, thereby making the integral piece jointed at the friction welded portion 3. Thereafter, in order to form a middle part thereof, as depicted in FIG. 7, the wall of the short tube coupon 1 of the integral piece is machined and removed by 4.5 mm in depth from outside at opposite sides to result in a parallel-sided portion, and thus, the test piece blank with the middle part comprising 29 mm in diameter, 5.0 mm in thickness and 150 mm in length was prepared. The test piece blank thus obtained was subjected to an induction hardening (heating temperature: 920 to 1000° C.), followed by tempering at 160° C. for 1 hr, to yield a complete test piece. Thereafter, under the unidirectional-repetitive-torsional torque of 2300 N·m, the respective test pieces were evaluated of the fatigue lifetime.

At the evaluation of the fatigue lifetime, a case where in a torsional fatigue test under the above loaded torque of 2300 N·m, the fatigue fracture does not occur until 500,000 cycles is shown with symbol ○, a case where the lifetime is observed to scatter and the fatigue fracture is partially caused before 500,000 cycles is shown with symbol □, and a case where the fatigue fracture is observed before 500,000 cycles is shown with symbol x.

TABLE 2

| Steel No. | Billet forging ratio | Induction hardening temperature | Prior austenite grain size | Cold workability | Hardenability | Fatigue lifetime | Remarks |
|---|---|---|---|---|---|---|---|
| 1 | 39 | 920 | 10.0 | ○ | ○ | ○ | Inventive example |
| 2 | 39 | 920 | 9.5 | ○ | ○ | ○ | Inventive example |
| 3 | 39 | 960 | 9.0 | ○ | ○ | ○ | Inventive example |
| 4 | 39 | 920 | 10.0 | ○ | ○ | ○ | Inventive example |
| 5 | 39 | 940 | 9.5 | ○ | ○ | ○ | Inventive example |
| 6 | 39 | 920 | 11.0 | ○ | ○ | ○ | Inventive example |
| 7 | 39 | 920 | 11.0 | ○ | ○ | ○ | Inventive example |
| 8 | 39 | 960 | 9.5 | ○ | ○ | ○ | Inventive example |
| 9 | 39 | 920 | 11.0 | ○ | ○ | ○ | Inventive example |
| 10 | 39 | 940 | 9.5 | ○ | ○ | ○ | Inventive example |
| 11 | 14 | 1000 | *7.0 | ○ | ○ | X | Comparative example |
| 12 | 14 | 960 | *8.0 | ○ | ○ | □ | Comparative example |
| 13 | 14 | 1000 | *8.0 | ○ | ○ | □ | Comparative example |
| *14 | 39 | 920 | 10.0 | ○ | ○ | □ | Comparative example |

TABLE 2-continued

| Steel No. | Billet forging ratio | Induction hardening temperature | Prior austenite grain size | Result of performance evaluation | | | Remarks |
|---|---|---|---|---|---|---|---|
| | | | | Cold workability | Hardenability | Fatigue lifetime | |
| *15 | 39 | 940 | 9.5 | X | ○ | □ | Comparative example |
| *16 | 39 | 960 | 9.0 | ○ | X | X | Comparative example |
| *17 | 39 | 960 | 9.5 | X | ○ | X | Comparative example |
| *18 | 39 | 920 | 10.0 | X | ○ | ○ | Comparative example |
| *19 | 39 | 920 | *8.5 | ○ | X | X | Comparative example |
| *20 | 39 | 920 | 10.5 | X | ○ | ○ | Comparative example |
| *21 | 39 | 920 | 10.0 | X | X | □ | Comparative example |
| *22 | 39 | 920 | *8.5 | X | X | X | Comparative example |
| *23 | 39 | 920 | *8.0 | ○ | X | □ | Comparative example |

Note)
Ones shown with * in the table are ones deviated from the conditions defined by the present invention.

Fatigue lifetime:

○: a case where in a torsional fatigue test under the unidirectional-repetitive-torsional torque of 2300 Nm, the fatigue fracture does not occur until 500,000 cycles.

□: a case where the lifetime largely scatters under the above torsional torque of 2300 Nm and the fatigue fracture is partially observed before 500,000 cycles.

X: a case where the fatigue fracture is observed under the above torsional torque of 2300 Nm before 500,000 cycles.

As shown in Table 2, steels of steel Nos. 1 through 10 are inventive examples satisfying the conditions (chemical composition and prior austenite grain size) defined by the present invention. All cases show results excellent in the fundamental performance such as the cold workability, the hardenability, the toughness and the torsional fatigue strength that are necessary for the hollow driving shaft; accordingly, it can be understood that these can exert stable fatigue lifetime as the hollow driving shaft.

On the other hand, among comparative steels of steel Nos. 11 through 23, steels of steel Nos. 11 through 13 do not satisfy the prior austenite grain size defined by the present invention and steels of steel Nos. 14 through 23 do not satisfy the chemical composition defined by the present invention. Accordingly, none of the comparative steels can simultaneously satisfy the fundamental performance such as the cold workability, the hardenability, the toughness and the torsional fatigue strength. As a result, these cannot be applied as the hollow driving shaft according to the present invention.

INDUSTRIAL APPLICABILITY

As described above, according to the induction-hardened hollow driving shaft according to the present invention, excellent cold workability, hardenability, toughness and torsional fatigue strength can be simultaneously satisfied. Accordingly, when a steel pipe is used as a raw material for a hollow shaft and is subjected to the reducing process or spinning process at a tube end, the crack thought to be caused by processing can be inhibited from occurring, and, when the induction hardening is applied after the cold working, an entire thickness upto an inner surface of the steel pipe can be hardened and at the same time high toughness can be secured, whereby, as a driving shaft, stable fatigue lifetime can be achieved. Accordingly, the hollow driving shaft according to the present invention is best suitable for an integral forming type hollow driving shaft and can be widely adopted in automobile parts.

What is claimed is:

1. An induction-hardened hollow driving shaft, comprising:
as a raw material, a steel pipe that contains, by mass %, 0.30 to 0.47% C, 0.22% or less Si, 0.3 to 2.0% Mn, 0.018% or less P, 0.005% or less S, 0.15 to 1.0% Cr, 0.001 to 0.05% Al, 0.005 to 0.05% Ti, 0.004% or less Ca, 0.01% or less N, 0.0005 to 0.005% B, 0.0050% or less O (oxygen) and the balance Fe and impurities and of which Beff defined by an equation (a) or (b) below is 0.0001 or more, wherein
a prior austenite grain size number (JIS G0551) after hardening is 9 or more, whereas, here with Ti, N and B each representing a content by %, in the case of Neff=N−14×Ti/47.9≧0, $$\text{Beff}=B-10.8\times(N-14\times Ti/47.9)/14 \qquad (a),$$

and similarly in the case of Neff=N−14×Ti/47.9<0, $$\text{Beff}=B \qquad (b).$$

2. An induction-hardened hollow driving shaft according to claim 1, further comprising at least one of, by mass %, 0.1% or less V and 0.1% or less Nb.

3. An induction-hardened hollow driving shaft, comprising:
as a raw material, a steel pipe that contains, by mass %, 0.30 to 0.47% C, 0.22% or less Si, 0.3 to 2.0% Mn, 0.018% or less P, 0.005% or less S, 0.15 to 1.0% Cr, 0.001 to 0.05% Al, 0.005 to 0.05% Ti, 0.004% or less Ca, 0.01% or less N, 0.0005 to 0.005% B, 0.0050% or less O (oxygen), furthermore at least one of 1% or less Cu, 1% or less Ni and 1% or less Mo, and the balance Fe and impurities and of which Beff defined by an equation (a) or (b) below is 0.0001 or more, wherein a prior austenite grain size number (JIS G0551) after hardening is 9 or more, whereas, here with Ti, N and B each representing a content by %, in the case of Neff=N−14×Ti/47.9≧0, $$Beff=B-10.8\times(N-14\times Ti/47.9)/14 \quad (a),$$

and similarly in the case of Neff=N−14×Ti/47.9<0, $$Beff=B \quad (b).$$

4. An induction-hardened hollow driving shaft according to claim 3, further comprising at least one of, by mass %, 0.1% or less V and 0.1% or less Nb.

* * * * *